Aug. 15, 1967    H. ENGESSER ET AL    3,335,882
POWER LOADER

Filed Oct. 4, 1965    2 Sheets-Sheet 1

INVENTORS
HEINZ ENGESSER
ERNST BRAND

BY *William A. Murray*

ATTORNEY

United States Patent Office 3,335,882
Patented Aug. 15, 1967

---

3,335,882
POWER LOADER
Heinz Engesser and Ernst Brand, Mannheim, Germany, assignors to Deere & Company, Moline, Ill., a corporation of Delaware
Filed Oct. 4, 1965, Ser. No. 492,673
Claims priority, application Germany, Oct. 8, 1964,
D 45,587
3 Claims. (Cl. 214—131)

This invention relates to a power loader adapted to be mounted on a tractor. More particularly the invention relates to the supporting frame for the loader that connects the power loader to the tractor.

In the conventional type power loaders, there is normally provided a main frame for the loader lift arms composed of a pair of side frames on opposite sides of the tractor body that supports the transverse pivots for the lift arms and the pivots that connect to the hydraulic lift cylinders that raise and lower the arms. The side frames are normally rigidly mounted on the tractor body thereby making it necessary to build these frames to close tolerances in order to fit the respective tractors. Since the side frames are rigid with the tractor body, any force sufficiently large that is created by or on the loader lift arms is transmitted directly to the tractor body. This is significant since the conventional type of side frames are constructed of steel having different qualities and characteristics than the steel or cast iron provided in the tractor body. Consequently, any distortion in the side frames due to the load on the loader bucket will cause the entire load to be transmitted to the tractor body or frame. It is not uncommon, due to this distortion, to cause breakage either in the main tractor frame or in the tractor body itself.

With the above in mind, it is proposed in the present invention to provide a mounting structure for the loader frame that will permit the frame to distort without the resultant force being applied directly to the tractor. Specifically, it is proposed to provide a pair of side frames with front and rear ends disposed alongside and on opposite sides of the tractor. The rear ends of the side frames are detachably connected to the tractor body in a rigid manner. The forward ends of the side frames are supported on a forwardly disposed, horizontal, and fore and aft pivot means that permits the forward ends of the side frames to shift axially or fore and aft and also to rock on the pivot means.

The above type of mounting arrangement for the loader frame permits the loader frame to be manufactured with relatively wide tolerances since it is capable of being adjusted fore and aft on the pivot. Also, should a large load be applied on one of the lift arms which would cause distortion of one of the side frames, or should both side frames be distorted due to a large load, the rocking feature of the fore-and-aft connection between the side frame and the forward pivot would automatically accommodate the distortion in the side frames. Thus the distortion in the side frames would not be transmitted to the tractor frame or to the main tractor body itself.

Other objects and advantages of the present invention will become apparent to those skilled in the art as the nature of the invention is better understood from the following description and as shown in the accompanying drawings.

Figure 1:
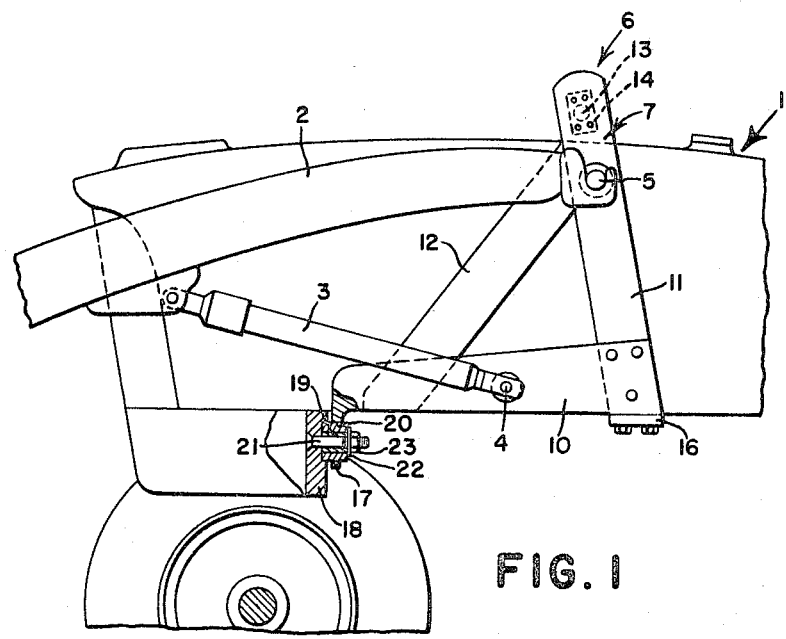
FIG. 1 is a side view, partially in section, of the forward end of a tractor and a loader frame supported thereon with part of the loader lift arms being shown.
Figure 3:
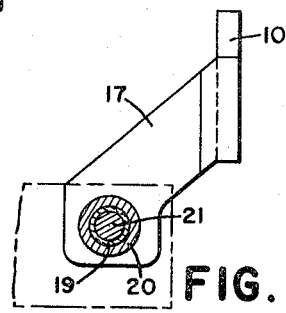
FIG. 3 is an enlarged sectional view taken substantially along the line 3—3 of FIG. 1.
Figure 2:
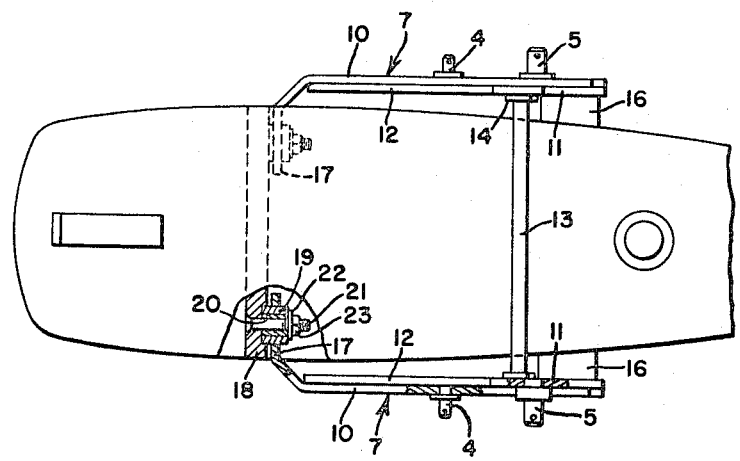
FIG. 2 is a plan view, partially in section, of the structure shown in FIG. 1.

In the form of the invention according to FIGS. 1–3, numeral 1 designates a frameless tractor having a front loader with two lift arms 2. Work cylinders 3 are connected to the lift arms 2 and operate to raise and lower the lift arms in a conventional manner. The cylinders 3 and lift arms 2 are supported on outwardly projecting studs 4 and 5 on a main frame 6. The loader frame 6 includes a pair of triangular shaped frame stands 7 on each side of tractor 1 with each being composed of three beams 10, 11 and 12. The bottom beam 10 is substantially parallel to the ground and the upright beam 11 is substantially at right angles and vertically offset thereto. The beam 12 is the hypotenuse of the triangular frame. The upright beams 11 are cross-connected at their upper ends by a cross member 13 extending over the tractor and having opposite ends provided with end plates 14 for rigid connection to the respective beams 11. On the lower ends the beams 11 are bolted to the beams 10 and are cross-connected by a member 16 that is bolted or otherwise fixed to the housing or motor block of the tractor 1. Each of the beams 10 have an integral vertical end portion 17 that is turned or formed inwardly in a transverse direction to lie adjacent to a tractor frame member 18. The frame member 18 underlies the underside of the tractor and is fixed to the front axle structure of the tractor. The frame member 18 supports a pair of bushings 20 that extend through openings in the respective end portions 17 for allowing axial movement as well as rocking motion on the bushings 20. Mounting stays or spacers 19 are provided internally of the bushings 20. A pair of screws 21 extend through the frame member 18 and carries the spacers 19 and bushings 20 thereon. Washers 22 and nuts 23 are provided on the rear ends of the screws 21 for maintaining the bushings on the frame member 18.

Figure 4:
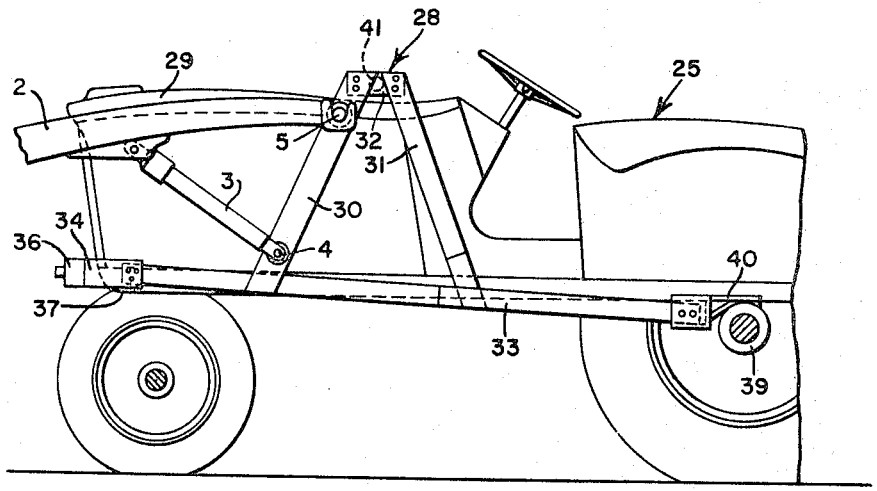
FIG. 4 is a side view of a major portion of a tractor and a loader frame having somewhat different characteristics than that shown in FIGS. 1 and 2.
Figure 5:
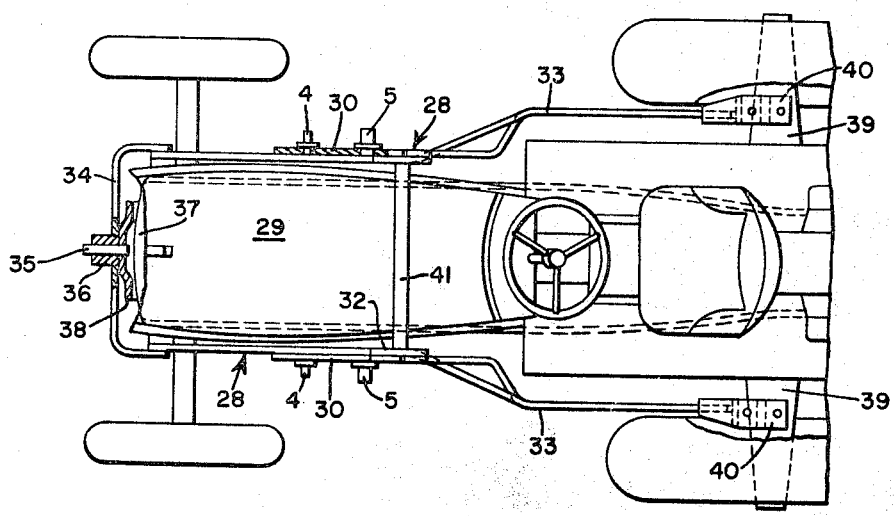
FIG. 5 is a plan view, partially in section, of the structure shown in FIG. 4.

In the form of the invention shown in FIGS. 4 and 5, the loader is supported on a frame-built tractor 25 in a manner whereby the lift arms 2 and the work cylinders 3 are supported on studs or bearings 4 and 5 arranged on mounting frames 28 on opposite sides of the tractor. Each mounting frame 28 is made up of two joined-together beams 30, 31, joined at their upper ends by a plate 32 above the tractor hood 29. The beams 30, 31 are connected at their lower ends with longitudinally arranged beams 33. The longitudinal beams 33 are bolted at their front ends to a U-shaped transverse beam 34. To carry the U-shaped frame or beam 31, there is provided a bushing 36 carried on a horizontal fore-and-aft extending stud 35 that projects forwardly from the forward end of the tractor. The stud 35 is connected to the tractor front axle support 37 by a plate 38.

On the rear ends, the side beams 33 are connected to the rear axle 39 of a tractor by connectors 40 that are bolted or otherwise disconnectibly and rigidly supported thereon. The beams 30 and 31 are connected at their upper ends by plates 32 on opposite ends of a cross beam 41.

By providing for the forward ends of the side frames to be supported for both axial and rockable movement on the fore-and-aft extending pivots at the forward end of the tractor, there is not required the necessity of manufacturing the loader frames to a close tolerance. Further, should the side frames become distorted due to load on one or both sides of the loader bucket, the distortion or bending of the side frames will be compensated for by the front mountings between the side frames and the tractor. Consequently, the distortion or bending of the side frames will not be transmitted to the tractor.

While only one modification of the invention has been shown, it should be recognized that other forms and variations will occur to those skilled in the art. Therefore, while the preferred forms were shown for the purpose of clearly and concisely illustrating the principles of the invention, it should be understood that there is no intention to limit or narrow the invention beyond the broad concepts set forth in the appended claims.

We claim:

1. A power loader for use on a tractor and having fore-and-aft lift arms on opposite sides of the tractor, the improvement residing in a pair of upright side frames with front and rear ends extending alongside and on opposite sides of the tractor and having a vertical offset portion adapted for connection to the lift arms; means at said one of the ends for rigidly connecting the respective ends to the tractor; a pair of transversely spaced fore-and-aft extending horizontal pivots supported on the tractor alongside its respective opposite sides and adjacent the opposite ends of the side frames; and a pair of vertical transverse brackets rigid with said opposite ends adapted for supporting the opposite ends for axially shiftable and rocking motion on the respective pivots.

2. The invention defined in claim 1 in which said opposite ends are the forward ends of the side frame, and the brackets are transverse inwardly extending flanges projecting under the underside of the tractor, and the horizontal pivots are on opposite sides of and on the underside of the tractor for supporting the respective flanges axially and rockably.

3. The invention defined in claim 1 in which the vertical offset portions are rigidly but detachably interconnected by a cross beam extending over the tractor and having opposite ends rigid with the offset portions and in which the rear ends are supported on the tractor by a transverse beam disposed beneath the tractor and rigidly affixed to the underside thereof with opposite ends thereof being rigidly but detachably fixed to the respective rear ends.

References Cited

UNITED STATES PATENTS

| | | | |
|---|---|---|---|
| 2,436,723 | 2/1948 | Machin | 214—140 |
| 2,519,974 | 8/1950 | Mork | 214—140 |
| 2,723,039 | 11/1955 | Stueland | 214—140 |
| 3,156,367 | 11/1964 | Griffith | 214—140 |
| 3,207,341 | 9/1965 | Griffith et al. | 214—140 |

HUGO O. SCHULZ, *Primary Examiner.*